United States Patent Office 3,415,808
Patented Dec. 10, 1968

3,415,808
AZO-DYESTUFFS CONTAINING 2-ARYL-ARYLENETHIAZOLE GROUPS
Kurt Weber, Basel, and Erwin Ingold, Riehen, Switzerland, assignors to Ciba Limited, Basel, Switzerland, a company of Switzerland
No Drawing. Filed Sept. 21, 1965, Ser. No. 489,057
Claims priority, application Switzerland, Sept. 25, 1964, 12,505/64; Aug. 26, 1965, 12,018/65
7 Claims. (Cl. 260—158)

ABSTRACT OF THE DISCLOSURE

Mono- and polyazo dyestuffs of the benzthiazoleazo series which are free from vattable polycyclic quinones, nitro groups, ureido groups, amino groups and acid hydroxyl groups; useful for dyeing cotton in the presence of reducing agents.

---

It is known to dye fibrous materials with azo-dyestuffs. Thus, for example, cellulose can be dyed with so-called direct azo-dyestuffs.

This invention is based on the observation that especially valuable dyeings can be produced on natural or regenerated cellulose with organic monoazo- or polyazo-compounds that are resistant to discharge in an alkaline medium, that possess a higher affinity only in the partially reduced state and that are free from vattable polycyclic quinones, by carrying out at least one stage of the pocess in an alkaline medium in the presence of a strong reducing agent that reduces at least one azo-group to the hydrazostage, and subsequently re-oxidising the dyestuff on the fibre to the azo-compound. As azo-dyestuffs there are to be understood organic azo-compounds which contain at least once the grouping —N=N— or oxidation products thereof, such as azoxides etc., in the case of polyazo-dyestuffs the azo linkages should not be bound directly to the same aromatic residue. These compounds must also contain at least one and, per azo linkage, at most two sulpho, sulphato or carboxyl groups, and are free from nitro, ureido, and amino groups, and also from acid hydroxyl groups, the latter groups being hydroxyl groups which are bound directly to one of the carbon atoms of a —C=C— double bond, or keto groups which are convertible by enolisation into such hydroxyl groups. The process is especially suitable for dyeing natural or regenerated cellulose from an aqueous alkaline medium.

Accordingly, the present invention provides a process for dyeing natural or regenerated cellulose with monoazo- or polyazo-dyestuffs which are free from vattable polycyclic quinones, acid hydroxyl groups, amino groups, ureido groups and nitro groups, and which advantageously contain a heterocyclic five-membered ring, which may contain the hetero atoms oxygen and/or nitrogen and/or sulphur, and especially a thiazole, oxazole, imidazole, oxidazole or triazole ring and also preferably contain further such rings and/or a stilbene or a carboxylic acid amide group, and which contain 1 to 3, advantageously 2, azo-groups, and, per azo-group, one or two sulpho, suplhato or carboxyl groups, in which process at least one stage thereof is carried out in the presence of a strong reducing agent, that reduces at least one azo-group to the hydrazo-stage, and in an aqueous alkaline medium, and the dyestuff is subsequently re-oxidised on the fibre to the azo-compound. As such reducing agents there are suitable, more especially alkali metal dithionites, such as sodium hydrosulphite and/or thiourea dioxide, and also sulphinic acid derivatives, advantageously α-hydroxy-alkane sulphinic acid derivatives, and if desired together with redox catalysts, which are chelate complexes or chelates of polyvalent transition metals, of which the lowest valency stage in the complex is not the most stable one. They contain as the central atom those metals which possess various valency stages and can be converted easily from one stage to another. Moreover, they must be water-soluble and be stable preferably to strong alkalis, but they must not permanently impart to the material to be dyed their own colour. Accordingly, there are used with advantage those compounds which are not absorbed substantively on the substratum or decomposed, because otherwise, if the complex or the decomposition products thereof possess a colour of their own, defects or dulling would result in the desired shade due to colour mixing. Suitable metals are above all transition metals having atomic numbers from 24 to 28, that is to say chromium, manganese, iron, cobalt and nickel. Especially important is cobalt. Complexes which fulfil these conditions may be, for example, compounds in which the metal atoms are surrounded in the adjacent sphere by four nitrogen atoms all of which may belong to the same molecule, or of which each pair are constituents of two identical or different molecules. Among those compounds in which the four nitrogen atoms that surround the central metal atom belong to a single molecule, there may be mentioned, for example, porphyrins and tetrazaporphyrins. Compounds having two nitrogen atoms capable of forming complexes may be, for example, nitrogeneous heterocycles. As examples of such compounds there may be mentioned dipyridyl and phenanthrolin, but, of course, other heterocycles having similar consititutions may be used.

There may also be used compounds in which one nitrogen atom is a constituent of a ring and the other is a member of a side chain. As such compounds there are included, for example, α-aldehyde-hydrazines, α-aldehyde-semicarbazones or α-aldoximes. As an example of such a compound there may be mentioned pyridine-2-aldoxime. Especially suitable, however, are hydrazones, semicarbazones or oximes of aliphatic, aliphatic-aromatic or cycloaliphatic dicarbonyl compounds (i.e. diketones and dialdehydes), of which the carbonyl groups are in 1,2- or 1,3-position relatively to one another, such, for example, as 1,2- or 1,3-dialdehydes or -diketones or aldehyde-ketones. Such aldehydes or ketones are, for example, glyoxal, malonic acid dialdehyde, methyl-glyoxal, formyl-acetone, diacetyl, acetyl-acetone, benzil, or homologues thereof, or also cyclohexane-1,2-dione.

The proportions in which these complexes are used may vary within rather wide limits, for example, 0.01 to 1 percent calculated on the total preparation, but in general 0.05 to 0.1 percent is sufficient.

The dyeing is advantageously carried out by the exhaustion methods or the padding methods, and especially by the pad-steaming or cold-dwell method.

As dyestuffs to be used in the process of the invention there may be mentioned, for example, those azo-dyestuffs which correspond to the above definition and contain at least once a 2-aryl-benzthiazole or -naphthiazole residue, advantageously a residue of the formula

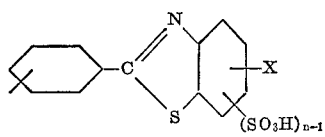

in which X represents H or —CH₃, and n is the whole number 1 or 2. Such dyestuffs correspond, for example, to the formula

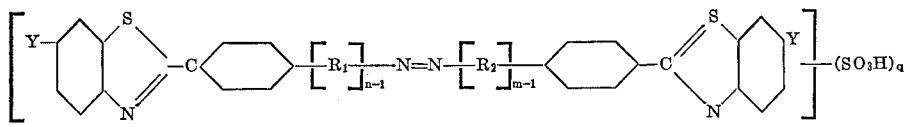

in which Y represents H or —CH₃, n and m represent the whole number 1 or 2, and R₁ and R₂ represent an aroylamino, aryl-NH—CO—, 2-aryl-benzthiazole, 2-aryl-6-carboylamino-benzthiazole or

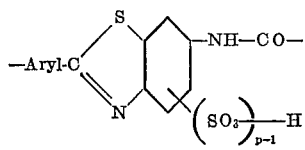

bridge bound directly through an aryl residue to the nitrogen atom of the azo-group or represent a direct bond, and in which n and m or R₁ and R₂ are advantageously identical, and p represents the whole number 1 or 2 and q is a whole number from 1 to 4. Suitable dyestuffs are also those of the formula

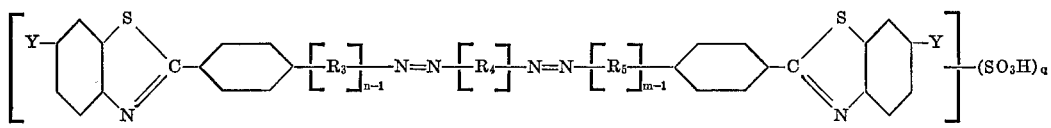

in which R₃ and R₅ represent an aroylamino or aryl-NH—CO— bridge bound through an aryl residue directly to the nitrogen atom of the azo-group, and R₄ represents a similarly bound stilbenylene or dicarboxylic acid diarylamide bridge, and n and m are the whole number 1 or 2 and in which n and m or R₃ and R₅ are advantageously identical and q is a whole number from 2 to 4.

As further azo-compounds for use in the process of the invention there may be mentioned those of the formula

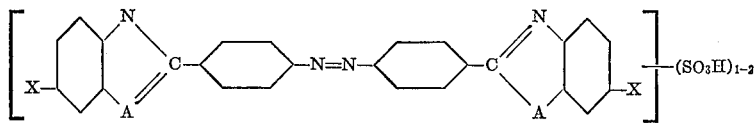

in which A represents an —S—, —O— or —NH-bridge, and X represents —H, —CH₃, —COOH or

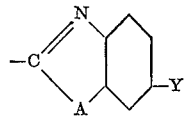

and Y represents —H or —CH₃; and azo-compounds of the formula

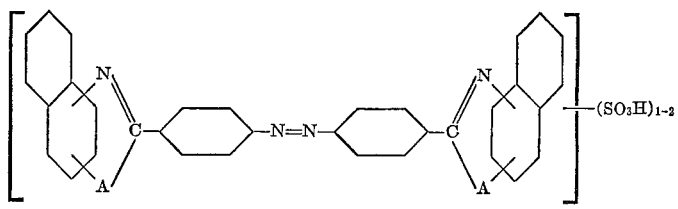

in which A has the meaning given above.

Such dyestuffs can be made, for example, by acylation, oxidation, condensation, coupling or sulphonation by the methods described below.

The invention also includes a process for the manufacture of azo-dyestuffs which are free from nitro groups, ureido groups and amino groups, and also from acid hydroxyl groups, that is to say hydroxyl groups which are bound directly to a carbon atom of a —C=C— double bond, or keto groups convertible by enolisation into such hydroxyl groups, and which dyestuffs correspond to the general formula

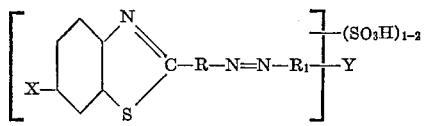

in which X represents —H, —CH₃, —COOH or

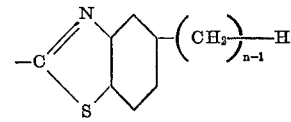

in which n is the whole number 1 or 2, R represents a benzene residue, R₁ represents an aryl residue, and Y represents an aromatic or heterocyclic carboylamide group or a residue of the formula

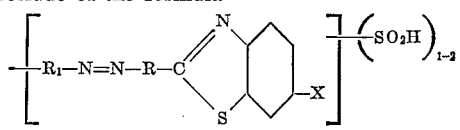

bound to R₁ through an aromatic or heterocyclic dicarboxylic acid diamide bridge, in which R₁, R and X

have the meanings given above and the two symbols R, R₁ and X are advantageously identical.

The process is characterized in that (1) amino azo-dyestuffs containing 1 or 2 benzthiazole groups are acylated with a reactive derivative, especially the anhydride or chloride, of an aromatic carboxylic acid, or dicarboxylic acid or (2) an amino-arylamide or a diamino-diaryldiamide of an aromatic dicarboxylic acid is united with one or two aminobenzthiazoles by the oxidative formation of the azo-, if desired azoxy-, bridges, or (3) a nitroarylamide or dinitrodiarylamide of an aromatic dicarboxylic acid is condensed with one or two aminobenzthiazoles or (4) an arylamide capable of coupling or a dicarboxylic acid diaryldiamide capable of coupling is coupled with 1 or 2 diazotised aminobenzthiazoles, and subsequently any amino groups still present are acylated with reactive derivatives of aromatic carboxylic acids or sulphonic acids or hydroxyl groups are alkylated or acylated with reactive derivatives of carboxylic acids or sulphonic acids, or (5) an azo-compound which contains a benzthiazole group and is free from sulphonic acid groups is sulphonated or sulphochlorinated with concentrated sulphuric acid, oleum or chlorosulphonic acid, and in the latter case the sulphochloride groups are converted by hydrolysis into sulpho groups.

Thus, for example, according to the above method (1), the amino-azo-dyestuff 2-(4″-aminophenylazophenyl)-6-methyl-benzthiazole sulphonic acid is acylated in the molar ratio 1:1 with an aromatic acid chloride, for example, benzoic acid chloride, or in the molar ratio 2:1 with an aromatic dicarboxylic acid dichloride, for example, with terephthalic acid chloride etc., or, for example, according to method (2) an amino-anilide of an aromatic monocarboxylic acid or a diamino-dianilide of an aromatic dicarboxylic acid can be united with one or two equivalents of 2 - (4′-aminophenyl)-6-methyl-benzthiazole sulphonic acid by oxidation to form the corresponding azo- or azoxy-compound, or, for example, according to method (3) a nitroanilide of an aromatic monocarboxylic acid or a dinitrodianilide of an aromatic dicarboxylic acid may be united by condensation with one or two equivalents of 2 - (4′ - aminophenyl)-6-methyl-benzthiazole sulphonic acid to form the corresponding azo- or azoxy-compound or, according to method (4) a hydroxy- or amino-anilide of an aromatic monocarboxylic acid or a dihydroxy- or diamino-dianilide of an aromatic dicarboxylic acid may be coupled with one or two equivalents of diazotised 2 - (4′-amino-phenyl)-6-methyl-benzthiazole sulphonic acid, and subsequently any amino groups still present are acylated with reactive derivatives of carboxylic acids or sulphonic acids, or any hydroxyl groups are alkylated or acylated with reactive derivatives of carboxylic acids or sulphonic acids.

Especially interesting is a process for the manufacture of dyestuffs of the formula

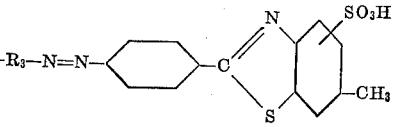

in which $R_2$, $R_3$ and D represent a benzene, thiophene or naphthalene residue, and $R_2$ and $R_3$ contain as substituents only methyl, methoxy or acylamino groups or halogen atoms, by acylating the corresponding 2-aminophenyl-(or -naphthyl-)azophenylbenzthiazole sulphonic acid with the anhydride or chloride of the corresponding dicarboxylic acid in the molar ratio of 2:1, or by coupling the corresponding diazotised 2 - (aminophenyl)-benzthiazole sulphonic acid with the corresponding diphenyldiamide or dinaphthyldiamide of an aromatic dicarboxylic acid containing in the residues $R_2$ and $R_3$ an amino or hydroxyl group that promotes coupling in the molar ratio 2:1, and subsequently acylating or tosylating the amino groups or subsequently alkylating, acylating or tosylating the hydroxyl groups.

With the dyestuffs so obtained fibrous materials, especially cellulosic materials and also synthetic fibres, for example, of regenerated cellulose, such as viscose, and also natural materials, such as linen or especially cotton, can be impregnated on a padding machine or dyed in dyebaths at a long goods-to-liquor ratio. For this purpose there are advantageously used aqueous solutions or very fine aqueous suspensions of the dyestuffs in question.

It is recommended to add with the dyestuffs or during the process of application more or less neutral and preferably inorganic salts, such as alkali metal chlorides or sulphates, which may be added in portions to the dyebath. It is especially advantageous in applying the azo-compounds in accordance with the invention to cellulose fibres to render the dyebath during or at the beginning of the dyeing process distinctly alkaline by the addition of an alkali, for example, by the addition of sodium carbonate, potassium carbonate, or a solution of caustic alkali. After the dyestuff has been applied to the material to be dyed, for example, by padding, the material may, if desired after being dried, be treated in a fresh alkaline bath in the presence of a strong reducing agent in order to fix the dyestuff.

As reducing agents there may be used strong reducing agents such, for example, as sodium hydrosulphite, thiourea dioxide or an α-hydroxylalkane sulphinic acid, advantageously together with one of the redox catalysts mentioned above.

Instead of preparing the dyebaths by taking up in water simultaneously or singly and in succession the appropriate azo-compound, the reducing agent, the alkali and, if desired, a more or less neutral, inorganic salt, the dyestuff and the salt may be worked up into the form of a paste or advantageously into the form of a dry preparation.

It is often desirable to dye in the presence of vat dyestuffs (which may be added in large quantities, i.e. as components of a mixture or in catalytic quantities), because in this manner the speed of vatting is greatly increased. In the same way the vatting can also be catalysed by the addition of certain quinoid compounds that do not have the character of vat dyestuffs, for example, anthraquinone derivatives, and especially 2-hydroxyanthraquinone and anthraquinone itself.

The dyeings which are produced with the new azo-dyestuffs that are made in accordance with the invention and applied by the process of the invention to fibrous materials, especially cellulose textile materials, exhibit, especially after being soaped at the boil, excellent wet fastness properties and especially an excellent fastness to chlorine, good fastness properties in washing at the boil, good fastness to boiling in soda in the presence of oxidising agents, a very good fastness to weather and a very good fastness to light.

As compared with the conventional direct dyeing method with the claimed dyestuffs, the process of this invention has the advantage of a considerably better dyestuff yield.

In the following examples the parts are by weight unless otherwise stated, the percentages are by weight, and the temperatures are given in degrees of centigrade.

The dyestuffs are generally isolated not as the free acids, but as their sodium salts, but they may be obtained in the form of other salts, especially as potassium or ammonium salts.

Example 1

47.6 parts of the compound of the following formula

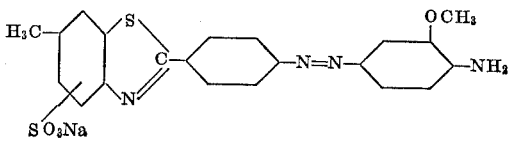

are suspended in a mixture of 600 parts by volume of dry nitrobenzene and 60 parts by volume of diethylaniline at 120 to 130° C. while stirring. The suspension is then cooled to 80° C. and 10.1 parts of terephthalic dichloride are added. The reaction mixture is then stirred for 9 hours at 80 to 85° C. The dyestuff which has crystallised out is then isolated by filtration and washed with nitrobenzene, benzene and alcohol. The dyestuff is then suspended in 3500 parts of water at 80 to 90° C. while stirring very well. The pH is adjusted to 10 by adding sodium hydroxide solution and the whole is stirred well for one hour under these conditions. The pH is then adjusted to 8 by adding hydrochloric acid and the fine suspension is evaporated to dryness. In this way 52.5 parts of the new azo dyestuff of the following formula

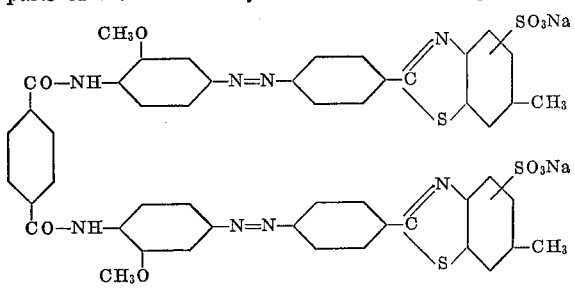

are obtained.

50 parts of the azo dyestuff obtained in this way are ground together with 50 parts of the disodium salt of dinaphthylmethane disulphonic acid in about 1000 parts of water in the ball mill. The dyestuff paste obtained in this way is then evaporated to dryness, a dyestuff preparation containing 50% of dyestuff pigment being formed.

2 parts of this dyestuff preparation are taken up in 500 parts of hot water and poured into the dyebath, which contains 3500 parts of water and 20 parts of sodium hydroxide solution of 30% strength. 12 parts of sodium hydrosulphite are added at boiling temperature and vatting is carried out for 10 minutes at this temperature. 100 parts of cotton are then introduced into the clear and practically colourless dyebath at 70° C. and this is dyed for three quarters of an hour at this temperature. After a dyeing time of 10 minutes, 20 parts of sodium chloride are added to the dyebath. The cotton is then removed from the bath, oxidised in the air, neutralised, thoroughly soaped at the boil, rinsed first with warm and then cold water and dried. A solid greenish-yellow colour is obtained which has excellent fastness properties, in particular fastness to washing by boiling, fastness to boiling soda in the presence of oxidising agents, fastness to chlorine, fastness to light, and fastness to exposure.

If the dyestuff is used for dyeing without a reducing agent, a very considerably weaker colour is obtained.

Instead of effecting the oxidation with air, it may be effected with equally good results with the oxidising agents which are usually employed in vat dyeing, for example with 2 to 4 g. of sodium perborate per litre at about 50 to 70° C. or with 0.5 to 1 ml. of hydrogen peroxide of 30 to 40% strength per litre at about 30 to 60° C.

Example 2

9.5 parts of the compound of the formula first mentioned in Example 1 are suspended in 300 parts of dry tetramethylenesulphone (Sulfolan) at 80 to 90° C. 2 parts of terephthalic dichloride are then added. The reaction mixture is stirred for 4 hours at 100 to 110° C. and for another 4 hours at 120 to 125° C. The dyestuff which is crystallised out is then isolated by filtration, suspended in 1500 parts of water at 80 to 90° C. and the suspension is adjusted to pH 9.5 with sodium hyroxide solution. After 150 parts of sodium chloride have been added, the precipitated dyestuff is isolated by filtration and washed with a little water. It is then dried under vacuum. The new azo dyestuff corresponds to the formula given in Example 1.

2 parts of this dyestuff are suspended in 500 parts of boiling water. The yellow suspension is poured into a solution, brought to 100° C., of 20 parts of sodium hydroxide solution of 30% strength and 12 parts of sodium hydrosulphite in 3500 parts of water. 100 parts of well wetted cotton are introduced into this dye bath at 100° C. and dyeing is carried out for 45 minutes at 100° C. After a dyeing time of 10 minutes, 10 parts of sodium chloride are added. The cotton is then removed from the bath, oxidised in the air, neutralised, thoroughly soaped at the boil, rinsed in warm and cold water and dried. An intense luminous greenish yellow colour is obtained, which is fast to washing by boiling, fast to boiling soda in the presence of oxidising agents and fast to chlorine. The fastness to light and exposure is excellent.

If the new azo dyestuff is employed in the above dyeing process, but without any reducing agent, a very considerable weaker and redder colour with poor fastness properties is obtained, which is unusable for practical purposes. A very similar colour is obtained when this dyestuff is employed by the normal direct-dyeing method.

Example 3

71.4 parts of the compound of the formula first mentioned in Example 1 are suspended while stirring in a mixture of 900 parts by volume of dry nitrobenzene and 90 parts by volume of diethylaniline at 120 to 130° C. The suspension is then cooled to 80° C. and 15.2 parts of terephthaloyl chloride are added. The reaction mixture is then stirred for 9 hours at 80 to 90° C. The dyestuff which is crystallised out is isolated by filtration, washed with nitrobenzene, benzene and alcohol and dried under vacuum. In this way, there are obtained 77.5 parts of a new azo dyestuff which corresponds in the form of its disodium salt to the formula given in Example 1.

2 parts of this dyestuff are made into a paste with 2.5 parts of alcohol and 500 parts of hot water and suspended for 10 minutes at the boil. This suspension is thereafter poured into the dye bath, which is prepared with 3465 parts of hot water, 20 parts of sodium hydroxide solution of 30% strength and 12 parts of sodium hydrosulphite, and vatting is carried out for 10 minutes in the dye vat. 100 parts of well prewetted cotton are introduced into this dyebath at 70° C. and the cotton is dyed for 45 minutes at 70° C. After a dyeing time of 10 minutes, 20 parts of sodium chloride are added. After dyeing, the cotton is removed from the bath and oxidised in the air, neutralised, thoroughly soaped at the boil and then rinsed first in warm and thereafter in cold water and dried. The colour obtained in this way is a pure, greenish and strong yellow shade.

Example 4

5 parts of the dyestuff preparation of 50% strength obtained according to Example 1, paragraph 2, are ground in a ball mill with 0.25 part of 2-hydroxyanthraquinone. 4 parts of the dyestuff preparation obtained in this way are suspended in 500 parts of hot water. This suspension is poured into a dyebath consisting of 24 parts of sodium hydroxide solution of 30% strength, 15 parts of sodium hydrosulphite and 3439 parts of water, the dyebath being at a temperature of 70° C., and vatting is carried out for 10 minutes at 70° C. A transparent slightly yellow vat is immediately obtained. 100 parts of well prewetted cotton are introduced into this dyebath and the cotton is dyed for three quarters of an hour at 70° C. After 10 minutes, 20 parts of sodium chloride are added to the dyebath. After dyeing, the cotton is removed from the bath, oxidised in the air, neutralised, then thoroughly soaped at the boil and thereafter rinsed with warm and then with cold water and dried. A pure, greenish-yellow colour with a standard depth of shade of about 1/1 is obtained. The fastness properties, i.e. fastness to washing by boiling, fastness to boiling soda in the presence of oxidising agents, fastness to chlorine bleaching and fastness to light are outstanding.

2 parts of the dyestuff obtained in accordance with Example 1 are ground in a ball mill without adding 2-hydroxy-anthraquinone. The fine dyestuff powder obtained in this way is formed into a suspension with 500 parts of hot water and further treated as described above. In contrast to the result obtained above, only a flocculent, weak yellow vat liquor is obtained with this preparation even after vatting for 10 minutes. Accordingly, the dyeing effect obtained in consequence is strikingly weaker than that which has been obtained with the dyestuff preparation first described.

Example 5

Pad-steam process.—50 parts of the azo dyestuff obtained in accordance with Example 1 are finely ground in a ball mill together with 50 parts of the disodium salt of dinaphthylmethane disulphonic acid in 900 parts of water. 200 parts of the 5% dyestuff paste obtained in this way are suspended in 800 parts of water and the suspension is boiled and then cooled to 25° C. 100 parts of dry cotton are then so padded in this padding liquor that its weight increases by about 60%, and intermediate drying is carried out for 30 minutes at 60° C. The cotton is then padded in a second bath (chemical bath), which contains 909 parts of water, 50 parts of sodium hydroxide solution of 30% strength, 30 parts of sodium formaldehyde sulphoxylate, 10 parts of anhydrous sodium sulphate and 1 part of cobalt complex of dimethylglyoxime of the formula $[Co(C_4H_7N_2O_2)_2(NH_3)_2]NO_3$, and immediately steamed for 1 minute at 100° C., oxidised in the air for 30 minutes, neutralised, thoroughly soaped and then washed with warm and cold water and dried. The yellow colour obtained in this way is deep, has excellent fastness properties, in particular fastness to washing at the boil, fastness to boiling soda in the presence of oxidising agents, fastness to chlorine, fastness to light and exposure and is about six times stronger than the colour which is obtained in the following manner without reducing agents:

200 parts of the dyestuff paste obtained as described in paragraph 1 are suspended in 800 parts of water and the suspension is boiled and cooled to 25° C. 100 parts of dry cotton are padded in this padding liquor as described above and intermediate drying is carried out for 30 minutes at 60° C. The cotton is then padded in a second bath, i.e. a chemical bath, which contains 990 parts of water and 10 parts of anhydrous sodium sulphate, and is immediately steamed for 1 minute at 100° C., neutralised, thoroughly soaped and then washed with warm and cold water and dried. A pale greenish yellow colour is obtained.

Example 6

Cold-dwell process.—200 parts of the 5% dyestuff paste obtained in accordance with Example 5, paragraph 1, are taken up in 800 parts of water, boiled and cooled to 25° C. Padding is carried out in this padding liquor as described in Example 5 and intermediate drying for 30 minutes at 60° C. is interposed. Padding is then carried out in a second bath containing 859 parts of water, 10 parts of anhydrous sodium sulphate, 50 parts of sodium hydroxide solution of 30% strength, 30 parts of sodium formaldehyde sulphoxylate, 1 part of cobalt complex of dimethylglyoxime of the formula $$[Co(C_4H_7N_2O_2)_2(NH_3)_2]NO_3$$

and 50 parts of triethanolamine and the substrate is immediately rolled up and stored in a plastics film for 8 hours at 30° C., air being excluded. The substrate is then oxidised in the air for 30 minutes, neutralised, thoroughly soaped and rinsed with warm and then with cold water and dried. The yellow colour obtained is deep, has excellent fastness properties, in particular fastness to washing at the boil, fastness to boiling soda in the presence of oxidising agents, fastness to chlorine, fastness to light and exposure, and is about six times stronger than the colour obtained without reducing agents in the following manner.

200 parts of the 5% dyestuff paste employed in paragraph 1 are taken up in 800 parts of water, boiled and cooled to 25° C. Padding is carried out in this padding liquor as described and intermediate drying for 30 minutes at 60° C. is interposed. Padding is carried out once more in the second bath, which contains 990 parts of water and 10 parts of anhydrous sodium sulphate, and the substrate is immediately rolled up and stored in a plastics film for 8 hours at 30° C., air being excluded. The substrate is then neutralised, thoroughly soaped, rinsed with warm and cold water and dried. A pale, greenish yellow colour is obtained.

Example 7

Single-bath steaming process.—904 parts of water are poured on to 10 parts of the dyestuff obtained as described in Example 1, boiled, cooled to 25° C. and 50 parts of sodium hydroxide solution of 30% strength, 30 parts of sodium formaldehyde sulphoxylate, 1 part of cobalt complex of dimethylglyoxime of the formula $[Co(C_4H_7N_2O_2)_2(NH_3)_2]NO_3$ and 5 parts of anhydrous sodium sulphate are then added. 100 parts of dry cotton are so padded in this padding liquor that the weight of the fabric increases by 60 to 70%, and the padded fabric is then immediately steamed for one minute at 100° C. After steaming, the substrate is oxidised in the air, neutralised, thoroughly soaped and then washed with warm and cold water and dried. The brilliant yellow colour obtained has a standard depth of shade of about 1/1, excellent fastness properties and is about five times stronger than the unreduced colour obtained as follows:

935 parts of water are poured on to 10 parts of the dyestuff obtained as described in Example 1, boiled and cooled to 25° C. and 50 parts of sodium hydroxide solution of 30% strength and 5 parts of anhydrous sodium sulphate are then added. 100 parts of dry cotton are padded in the padding liquor as described and immediately steamed for 1 minute at 100° C. After steaming, the substrate is neutralized, thoroughly soaped and then washed with warm and cold water and dried. The yellow colour obtained in this way is very pale and changes considerably as a result of soaping.

If, in this example, instead of 10 parts of the dyestuff obtained as described in Example 1, 200 parts of the 5% dyestuff paste obtained as described in Example 5, paragraph 1 and a correspondingly smaller amount of water are employed, a very similar result is obtained.

If 20 parts of thiourea dioxide are used in this Example, paragraph 1, instead of 30 parts of sodium formaldehyde sulphoxylate and 1 part of the cobalt complex mentioned, and the procedure described therein is followed, an equally good result is obtained.

Example 8

Single-bath cold-dwell process.—10 parts of the dyestuff obtained as described in Example 1 are taken up in 854 parts of water, boiled and cooled to 25° C. 50 parts of sodium hydroxide solution of 30% strength, 30 parts of sodium formaldehyde sulphoxylate, 1 part of cobalt complex of dimethylglyoxime of the formula $[Co(C_4H_7N_2O_2)_2(NH_3)_2]NO_3$, 50 parts of triethanolamine and 5 parts of anhydrous sodium sulphate are then added, padding is carried out as described in Example 7, and the substrate is immediately rolled up and stored in a plastics film for 8 hours at 30° C., air being excluded. The substrate is then oxidized in the air for 30 minutes, neutralized, thoroughly soaped and rinsed with warm and cold water and dried. This dyeing carried out with reducing agent gives a pure greenish yellow shade with excellent fastness properties and which is about three times stronger than the color which is obtained without reducing agent in the following manner:

10 parts of the dyestuff obtained as described in Example 1 are taken up in 935 parts of hot water, boiled and cooled to 25° C. and 50 parts of sodium hydroxide solution of 30% strength and 5 parts of anhydrous sodium sulphate are then added. 100 parts of dry cotton are then padded in this padding liquor as described, immediately rolled up and left in a plastics film for 8 hours, air being excluded. The cotton is thereafter neutralized, thoroughly soaped, rinsed with warm and cold water and dried. A pale greenish-yellow colour is obtained.

If, in this example, instead of 10 parts of the dyestuff obtained as described in Example 1, 200 parts of the 5% dyestuff paste obtained as described in Example 5, paragraph 1, and a correspondingly smaller amount of water are employed, a very similar result is obtained.

Example 9

0.18 part of the dyestuff according to Example 3 is suspended together with 0.8 part of a microdisperse form of the vat dyestuff of the formula

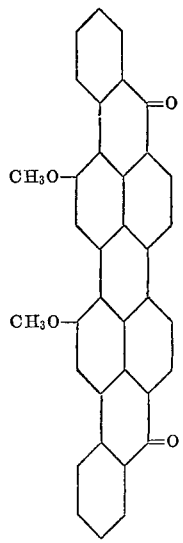

in 500 parts of water at 70° C. and 20 parts of sodium hydroxide solution of 30% strength and 12 parts of sodium hydrosulphite are added. Vatting is carried out for 10 minutes at 70° C. and this blue solution is then

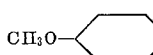

poured into 3447 parts of water. 100 parts of well prewetted cotton are introduced into this dyebath at 70° C. and dying is carried out for 45 minutes at this temperature. After a dyeing time of 10 minutes 20 parts of sodium chloride are added to the dyebath. The substrate is then removed from the bath, oxidized in the air, neutralized, thoroughly soaped at the boil, rinsed first in warm and then in cold water and dried. The luminous greenish yellow color obtained in this way is distinguished by outstanding properties when washed at the boil, fastness to boiling soda in the presence of oxidizing agent, resistance to chlorine bleaching, fastness to light and by excellent fastness to exposure.

Example 10

2.5 parts of the dyestuff according to Example 3 are suspended together with 0.09 part of a microdisperse form of the vat dyestuff of the formula given in Example 9 in 500 parts of water at 70° C. and 20 parts of sodium hydroxide solution of 30% strength and 12 parts of sodium hydrosulphite are added. Vatting is carried out for 10 minutes at 70° C. and a clear solution is obtained. This solution is added to 3446 parts of water at 70° C. 100 parts of well prewetted cotton are introduced into the dyebath at 70° C. and dyeing is carried out for 45 minutes at this temperature. After a dyeing time of 10 minutes, 20 parts of sodium chloride are added to the dyebath. After a dyeing time of 45 minutes, the substrate is removed, oxidized in the air, neutralized, thoroughly soaped at the boil, rinsed, first in warm and then in cold water and dried. The pure very yellowish green colour obtained shows excellent fastness to wet treatment, (washing at the boil, fastness to boiling soda in the presence of oxidizing agent, chlorine bleaching) and excellent fastness to light.

Example 11

4 parts of the dyestuff according to Example 3 are suspended with 0.44 part of a microdisperse form of the vat dyestuff of the formula

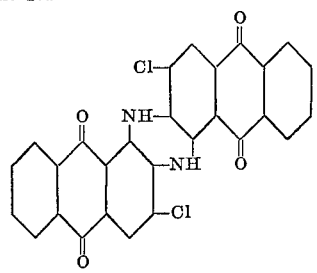

in 500 parts of water at 70° C. and 20 parts of sodium hydroxide solution of 30% strength and 12 parts of sodium hydro-sulphite are added. Vatting is carried out for 10 minutes at 70° C. and a clear solution is obtained. This solution is is added to 3444 parts of water at 70° C. 100 parts of well prewetted cotton are introduced into the dyebath at 70° C. and dyeing is carried out for 45 minutes at this temperature. After a dyeing time of 10 minutes, 20 parts of sodium chloride are added to the dyebath. After a dyeing time of 45 minutes, the substrate is removed, oxidized in the air, neutralized, thoroughly soaped at the boil, rinsed first in warm and then in cold water and dried. The yellowish green colour shows very good fastness to wet treatments and has excellent fastness to light.

Example 12

2.5 parts of the dyestuff according to Example 1 are finely ground in a ball mill in about 50 parts of water together with 2.5 parts of the vat dyestuff of the formula

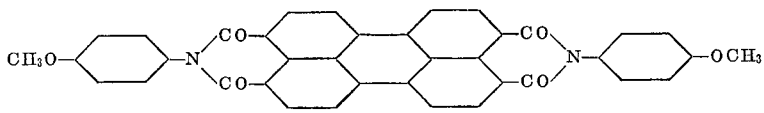

and 5 parts of the disodium salt of dinaphthylmethane disulphonic acid. The dyestuff paste obtained in this way is then evaporated to dryness.

4 parts of this dyestuff preparation are taken up in 1000 parts of hot water and boiled. This suspension is added to a bath containing 24 parts of sodium hydroxide solution of 30% strength, 15 parts of sodium hydrosulphite and 2937 parts of water and vatting is carried out for 10 minutes at 70° C. 100 parts of cotton are introduced into this clear violet dyebath and dyeing is carried out for three quarters of an hour at 70° C. After a dyeing time of 10 minutes, 20 parts of sodium chloride are added to the bath. The substrate is then removed from the bath, oxidised in the air, neutralised, thoroughly soaped at the boil, rinsed first in warm and then in cold water and dried. A pure yellowish-orange colour is obtained which is fast to washing at the boil, fast to boiling soda in the presence of oxidising agent, fast to chlorine and has high fastness to light.

Example 13

2.5 parts of the dyestuff according to Example 1 are finely ground in a ball mill in about 50 parts of water together with 2.5 parts of the vat dyestuff of the formula

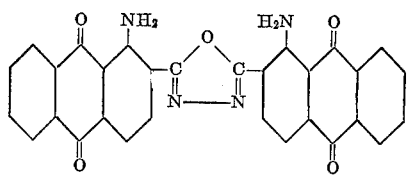

and 5 parts of the disodium salt of dinaphthylmethane disulphonic acid. The dyestuff paste obtained in this way is then evaporated to dryness.

4 parts of this dyestuff preparation are vatted as described in Example 12 and cotton is dyed therewith. An orange brown shade with excellent fastness properties is obtained.

Example 14

4 parts of the azo dyestuff according to Example 1 are ground in a ball mill with one part of a very fine form of the dyestuff according to Colour Index No. 74,140.

0.5 part of alcohol is poured on to 2 parts of this dyestuff mixture, which is made into a paste with 500 parts of water and boiled. After boiling, the suspension is poured into a dyebath which has been prepared with 3446 parts of water, 20 parts of sodium hydroxide solution of 30% strength and 12 parts of sodium hydrosulphite, and vatting is carried out at 70° C. 100 parts of well prewetted cotton are introduced into the dyebath at 70° C. and dyeing is carried out for 45 minutes at 70° C. After a dyeing time of 10 minutes, 20 parts of sodium chloride are added to the dyebath. After the dyeing, the substrate is removed from the bath, oxidised in the air, neutralised, thoroughly soaped at the boil, rinsed with warm and cold water and dried. A very pure, yellowish green and strong colour is obtained. The fastness to light, fastness to washing at the boil and fastness to boiling soda in the presence of oxidising agent are good.

Example 15

Pad-steam process.—17 parts of the azo dyestuff obtained as described in Example 1 are finely ground in a ball mill in 900 parts of water together with 33 parts of the vat dyestuff of the formula given in Example 9, with the addition of 50 parts of the disodium salt of dinaphthylmethane disulphonic acid.

200 parts of the 5% dyestuff paste obtained in this way are suspended in 800 parts of water, boiled and cooled to 25° C. 100 parts of dry cotton are so padded in this padding liquor that the weight of the fabric increases by 60 to 70%, and intermediate drying is carried out for 30 minutes at 60° C. The cotton is then similarly padded in a second bath containing 860 parts of water, 80 parts of sodium hydroxide solution of 30% strength, 50 parts of sodium hydrosulphite and 10 parts of anhydrous sodium sulphate, and is steamed continuously for 1 minute at 100° C., oxidised with 3 ml. of hydrogen peroxide of 30 to 40% strength per litre of water, rinsed, neutralised, soaped at the boil, rinsed with warm and cold water and dried. A brilliant yellowish green colour having excellent fastness properties is obtained.

Example 16

Pad-steam process.—9.5 parts of the azo dyestuff obtained as described in Example 1 are finely ground in a ball mill in 900 parts of water together with 40.5 parts of the vat dyestuff of the formula given in Example 9 with the addition of 50 parts of the disodium salt of dinaphthylmethanedisulphonic acid.

200 parts of the 5% dyestuff paste obtained in this way are suspended in 800 parts of water, boiled and cooled to 25° C. 100 parts of dry cotton are so padded in this padding liquor that the weight of the fabric increases by 60 to 70%, and intermediate drying is carried out for 30 minutes at 60° C. The cotton is then similarly padded in a second bath containing 860 parts of water, 80 parts of sodium hydroxide solution of 30% strength, 50 parts of sodium hydrosulphite and 10 parts of anhydrous sodium sulphate, and is steamed continuously for 1 minute at 100° C., oxidised with 3 ml. of hydrogen peroxide of 30 to 40% strength per litre of water, rinsed, neutralised, soaped at the boil, rinsed with warm and cold water and dried. A brilliant, yellowish green colour having excellent fastness properties is obtained.

Example 17

13.4 parts of the compound of the formula

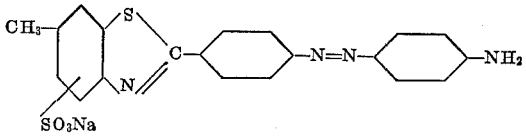

are suspended in a mixture of 200 parts by volume of dry nitrobenzene and 20 parts by volume of diethylaniline at 120 to 130° C. while stirring. The suspension is then cooled to 70° C. and 3 parts of terephthaloyl chloride are added. The reaction mixture is then kept for 17 hours at 80 to 90° C. The dyestuff which is crystallised out is isolated by filtration and washed with nitrobenzene, benzene and alcohol. The dyestuff is then suspended in about 1000 parts of water at 80 to 90° C. while stirring well. The pH of the suspension is adjusted to 10 by adding sodium hydroxide solution and the whole is well stirred for 3 hours under these conditions. The pH value is then adjusted to 8 by adding hydrochloric acid and the fine suspension is evaporated to dryness. The new azo dyestuff obtained in this way corresponds to the formula

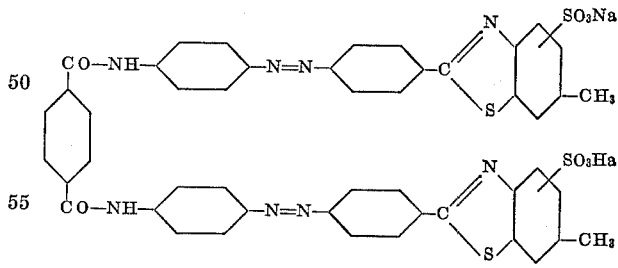

0.5 part of alcohol is poured on to 2 parts of this dyestuff and a paste is made with 500 parts of water and boiled. After boiling, the suspension is poured into a dyebath prepared with 3446 parts of water, 20 parts of sodium hydroxide solution of 30% strength and 12 parts of sodium hydrosulphite and vatting is carried out at 80° C. 100 parts of well prewetted cotton are introduced into the dyebath at 80° C. and dyeing is carried out for 45 minutes at 80° C. After a dyeing time of 10 minutes, 20 parts of sodium chloride are added to the dyebath. After dyeing, the cotton is oxidised in the air, then neutralised, thoroughly soaped at the boil, rinsed with warm and cold water and dried. A very pure, greenish yellow colour is obtained. The fastness to light is very good. Outstanding fastness to washing and the boil, to boiling soda in the presence of oxidising agent and to chlorine bleaching is obtained.

Example 18

If, instead of 2 parts of terephathalic acid dichloride, the same amount of isophthalic acid dichloride is used in Example 1, the dyestuff of the formula

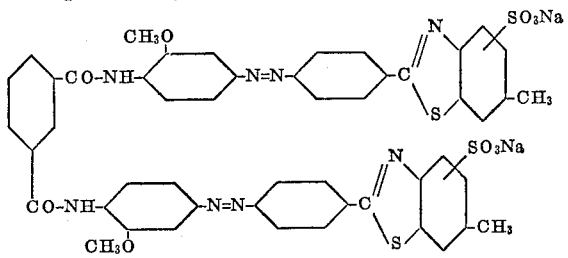

is obtained.

When cotton is dyed in accordance with the dyeing directions given in Example 2, but at 90° C. with 6 parts of thiourea dioxide instead of 12 parts of sodium hydrosulphite and with the addition of 80 parts of sodium chloride, a greenish yellow colour with good fastness properties is obtained with this dyestuff.

Example 19

47.6 parts of the compound of the formula

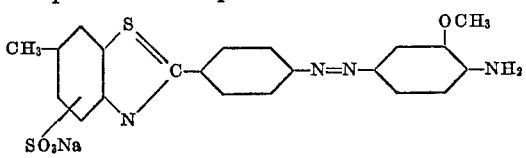

are suspended in a mixture of 700 parts by volume of dry nitrobenzene and 150 parts by volume of diethylaniline at 120 to 130° C. while stirring. After cooling to 20° C., 28.1 parts of benzoyl chloride are added and the mixture is stirred for 19 hours at 20 to 25° C. The condensation product which is crystallised out in fine needles is isolated by filtration and washed with benzene, alcohol and acetone. The dyestuff is then suspended in 4000 parts of water at 80 to 90° C. while stirring well and the suspension is adjusted to pH 10 by adding sodium hydroxide solution. The whole is stirred under these conditions for 2 hours. The pH value is then adjusted to 8 by adding hydrochloric acid, 200 parts of sodium chloride are added and the dyestuff is isolated by filtration. The new azo dyestuff obtained in this way has the formula

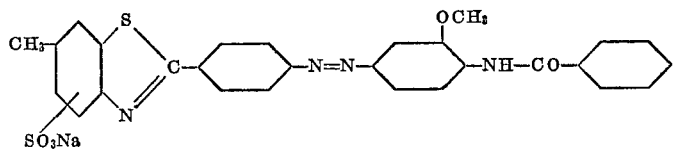

10 parts of this dyestuff are dissolved in 1000 parts of water at the boil. The solution is cooled to room temperature and a cotton fabric is padded therewith as described in Example 5. Intermediate drying is then carried out and the fabric is padded again in the chemical bath described in Example 5, steamed for 1 minute at 100° C., oxidised in the air for 30 minutes, neutralised, thoroughly rinsed and dried. A deep yellow colour is obtained which is twice as strong as the colour which is obtained without reducing agent in the following manner:

After the cotton fabric has been impregnated with the above-described dyestuff solution and dried, it is padded in a chemical bath containing only 10 g. of anhydrous sodium sulphate per litre and not containing any reducing agent and the further procedure described above is followed. A yellow colour of low strength is obtained.

Example 20

9.5 parts of the compound of the formula first mentioned in Example 19 are suspended in a mixture of 150 parts by volume of dry nitrobenzene and 11 parts by volume of diethylaniline at 110 to 120° C. while stirring. The suspension is then cooled to 50° C. and 3.1 parts of azobenzene-4,4'-dicarboxylic acid dichloride are added. The whole is then kept at 50 to 55° C. for 23 hours. The dyestuff which is crystallised out is then isolated by filtration and suspended in 2000 parts of water at 80 to 90° C. while stirring well. The pH value of the suspension is then adjusted to 10 by adding sodium hydroxide solution and the whole is well stirred for 45 minutes under these conditions. The pH value is then adjusted to 8 by adding hydrochloric acid, 100 parts of sodium chloride are added and the precipitated dyestuff is isolated by filtration, washed with a little cold water and dried under vacuum. The new azo dyestuff obtained in this way corresponds to the formula

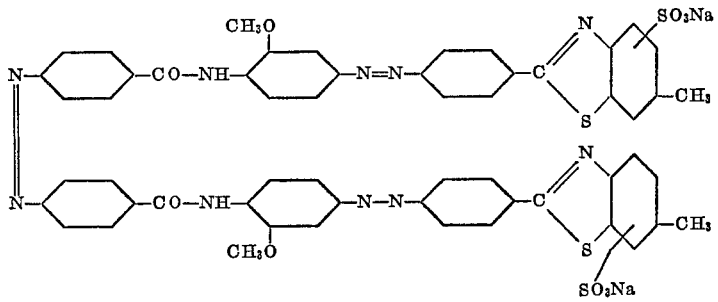

10 parts of this dyestuff are ground in the form of a very fine powder with a little Turkey-red oil and 1000 parts of hot water are poured on to this mixture and it is suspended at the boil. A cotton fabric is padded as described in Example 5 with the very fine hot suspension obtained in this way, intermediate drying is carried out and the fabric is further treated as described in the said example. After soaping at the boil, a strong yellow colour is obtained which is five to six times stronger than a colour which is obtained without reducing agent as described hereinafter. The fastness properties, such as fastness to washing at the boil, fastness to boiling soda in the presence of oxidising agent, fastness to chlorine bleaching and fastness to light are very good. The shade does not undergo any change as a result of the washing with soap.

After the cotton fabric has been impregnated with the above-described dyestuff suspension and dried, it is padded in a chemical bath containing only 10 g. of anhydrous sodium sulphate per litre and not containing any reducing agent, and the further procedure as described in Example 5 is followed. A pale yellow colour is obtained which undergoes a distinct change of shade as a result of the washing with soap.

Example 21

If, in Example 1, instead of 10.1 parts of terephthaloyl chloride, the equivalent amount of 2,5-dichloroterephthaloylchloride is used for a reaction time of 20 hours and the dyestuff formed is isolated as described in Example 20, the new azo dyestuff of the formula

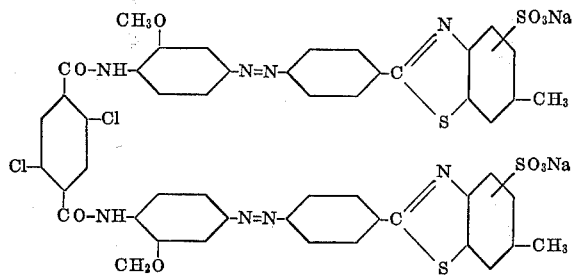

is obtained. When this dyestuff is used in the pad-steam process described in Example 20, a deep greenish yellow colour is obtained which does not undergo any change of shade as a result of the washing with soap.

If, on the other hand, the pad-steam process described in the said example is so carried out that the chemical bath contains only 10 g. of anhydrous sodium sulphate per litre and no reducing agent, a dull, pale orange colour is obtained which undergoes a very marked change of shade towards yellow as a result of the washing with soap.

Example 22

4.8 parts of the compound of the formula first mentioned in Example 19 are suspended in a mixture of 100 parts by volume of dry nitrobenzene and 6 parts of diethyl aniline at 110 to 120° C. while stirring. After cooling to 20° C., 3.3 parts of the acid chloride of the formula

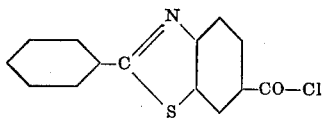

are added and the reaction mixture is kept at 20 to 25° C. for one hour, at 40 to 45° C. for 4 hours and at 80 to 85° C. for one hour. The dyestuff which has crystallised out in flakes is isolated by filtration and washed with benzene and alcohol. The further working up is effected as described in Example 20. The new azo dyestuff obtained in this way corresponds to the formula

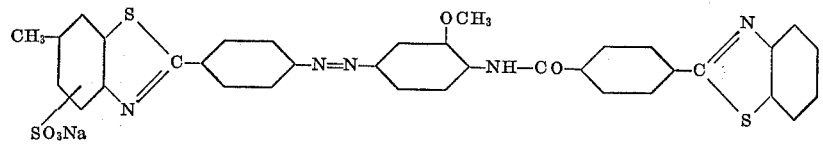

10 parts of the dyestuff obtained in this way are finely ground in a ball mill in 80 parts of water together with 10 parts of the disodium salt of dinaphthylmethane disulphonic acid.

100 parts of the 10% paste obtained in this way are suspended in 900 parts of water at the boil. The suspension is cooled to 25° C. and a cotton fabric is dyed therewith by the pad-steam method described in Example 5. A greenish yellow colour is obtained which is more than 100% stronger than the colour obtained without reducing agent.

If, on the other hand, the pad-steam method described in the said example is so carried out that the chemical bath contains only 10 g. of anhydrous sodium sulphate per litre and no reducing agent, a week colour is obtained which is given a distinctly redder shade by the washing with soap.

The 2-phenylbenzothiazole carboxylic acid chloride used in this example may be obtained, for example, by condensation of 2-amino-5-carboxythiophenol hydrochloride with benzoyl chloride in pyridine and conversion of the 2-phenylbenzothiazole carboxylic acid formed into the acid chloride with phosphorus pentachloride in chlorobenzene.

Example 23

If, in Example 22, instead of the phenylbenzothiazole carboxylic acid chloride used therein, the chloride of the formula

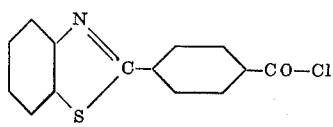

is used, a somewhat cloudy solution is formed after conversion has been completed. The solution is clarified by filtration and the dyestuff in the filtrate is precipitated by adding alcohol and isolated by filtration. Further working up is effected as described in Example 22. The new azo dyestuff obtained in this way corresponds to the formula

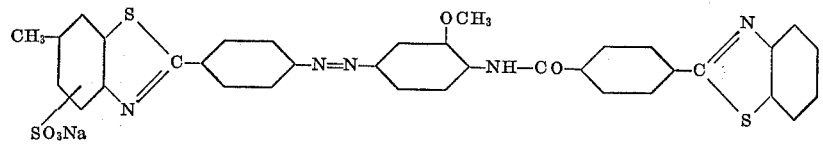

When dyeing is carried out with this dyestuff by the pad-steam process as described in Example 22, practically the same result is obtained.

The acid chloride of 2-(4'-carboxyphenyl)-benzothiazole which is used in this example may be obtained, for example, as follows:

Condensation of 2-aminothiophenol with p-carbomethoxybenzoyl chloride in pyridine to give 2-(4'-carbomethoxyphenyl)-benzothiazole, saponification with sodium hydroxide solution in dioxane to give 2-(4'-carboxyphenyl)-benzothiazole and conversion into the acid chloride with phosphorus pentachloride in chlorobenzene.

Example 24

The following new yellow azo dyestuffs can be obtained when the corresponding acid chlorides are employed as in the method described in Example 22:

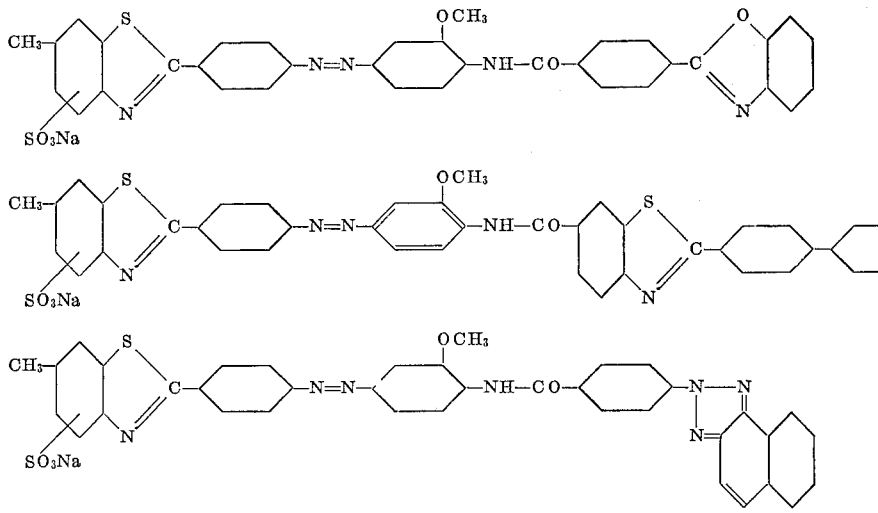

Example 25

2 parts of dyestuff of the formula

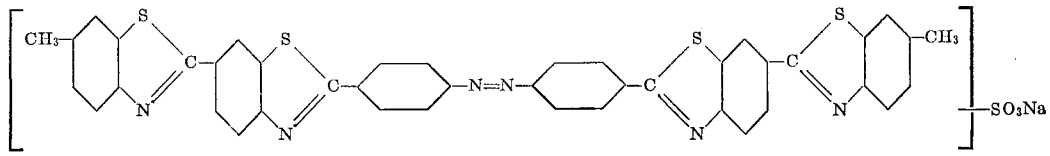

are dissolved in 500 parts of water at boiling temperature. The yellow solution is poured into a solution of 20 parts of sodium hydroxide solution of 30% strength and 12 parts of sodium hydrosulphite in 3456 parts of water, the second-mentioned solution being at a temperature of 100° C. 100 parts of well wetted cotton are introduced into this dyebath at 100° C. and dyeing is carried out for 45 minutes at 100° C. After a dyeing time of 10 minutes, 5 parts of sodium chloride are added and after a dyeing time of 20 minutes another 5 parts of sodium chloride are added. The cotton is then removed from the bath, oxidised in the air and then thoroughly rinsed in running water. A strong golden-yellow colour with good fastness properties is obtained. If this colour is treated at the boil in a soap bath for 30 minutes, a somewhat paler colour is obtained which, however, is fast to washing at the boil, fast to boiling soda in the presence of oxidising agents and fast to chlorine. The fastness of this colour to light is excellent.

If the process is carried out without adding reducing agent, substantially paler colours with considerably poorer fastness to wet treatments are obtained.

The dyestuff employed in this example may be prepared, for instance in the following manner:

6.1 parts of the zinc salt of 2-(4'-amino-3'-mercapto-phenyl)-6-methyl-benzothiazole are heated for 5 hours at 120 to 130° C. and for one hour at 140 to 150° C. in 200 parts of dry trichlorobenzene together with 3.1 parts of azobenzene-p,p'-dicarboxylic acid dichloride while stirring. The dyestuff which is crystallised out is isolated by filtration and washed with benzene, alcohol and hot water. After drying, the dyestuff is recrystallised from boiling nitrobenzene.

2.4 parts of the compound of the formula

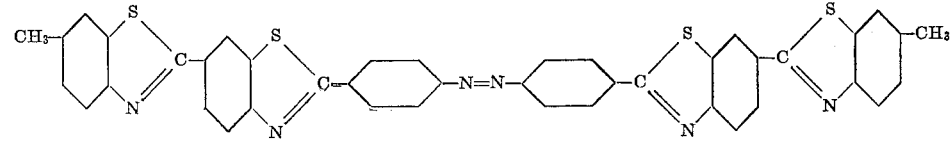

obtained in this way are added at room temperature to 200 parts of oleum having an $SO_3$ content of 27% and, after being completely dissolved, the solution is stirred for about one hour at 20 to 25° C. until a sample forms a clear solution in boiling water after the addition of a quantity of sodium hydroxide solution sufficient to produce a weakly alkaline reaction. The reaction mixture is carefully poured on to ice water and the precipitated dyestuff is isolated by filtration. The moist filter cake is dissolved in 500 parts of water at 70 to 80° C. and a pH of 9.5. 40 parts of sodium chloride are added to the clear solution. The precipitated dyestuff is isolated by filtration and dried under vacuum.

EXAMPLE 26

40 parts of Direct Yellow 29, Colour Index No. 19,556 are boiled with 819 parts of water, dissolved and cooled to 25° C. 50 parts of sodium hydroxide solution of 30% strength, 30 parts of sodium formaldehyde sulphoxylate, 1 part of cobalt complex of dimethylglyoxime of the formula $[Co(C_4H_7N_2O_2)_2]NO_3$ and 20 parts of anhydrous sodium sulphate are then added and a cotton fabric is so padded that the weight of the fabric increases by 60 to 70%. After the padding operation, the substrate is immediately rolled up and stored in a plastics foil for 8 hours at 30° C., air being excluded. The fabric is then oxidised in the air for 30 minutes, neutralized, rinsed and dried. A deep yellow colour is obtained which is three times stronger than the colour obtained without reducing agent in the following manner:

40 parts of Direct Yellow 29 are boiled with 900 parts of water and dissolved. 20 parts of anhydrous sodium sulphate are then added and padding is carried out in the manner described above. After padding, the substrate is immediately rolled up and stored in a plastics foil for 8 hours at 30° C., air being excluded. The fabric is then oxidised in the air for 30 minutes, neutralized, rinsed and dried. A yellow colour is obtained which is three times weaker than the colour obtained with reducing agent.

EXAMPLE 27

20 parts of a 10% dyestuff paste which has been obtained by grinding 1 part of the azo dyestuff of the formula

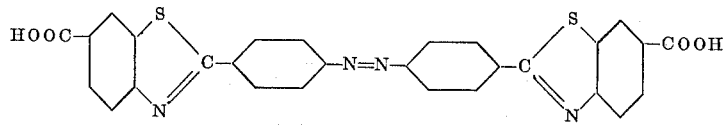

with 1 part of the disodium salt of dinaphthylmethanedisulphonic acid and 8 parts of water in a ball mill are suspended in 500 parts of water at boiling temperature. The yellow suspension is poured into a dyebath which is prepared with 3450 parts of water, 20 parts of sodium hydroxide solution of 30% strength and 12 parts of sodium hydrosulphite and vatting is carried out at 95° C. 100 parts of well wetted cotton are introduced into the the dyebath and dyeing is carried out for three quarters of an hour at 95° C. After a dyeing time of 10 minutes, 8 parts of anhydrous sodium sulphate are added to the bath. After dyeing, the cotton is oxidised in the air, neutralised, thoroughly soaped at the boil, rinsed with warm and cold water and dried. A deep greenish yellow colour is obtained which is five times stronger than the colour which is obtained without reducing agent in the following manner:

20 parts of the 10% dyestuff paste described above are suspended in 500 parts of water and boiled. This suspension is poured into a dyebath containing 3480 parts of water. 100 parts of well wetted cotton are introduced and dyeing is carried out for three quarters of an hour at 90° C. After 10 minutes, 8 parts of anhydrous sodium sulphate are added to the dyebath. After dyeing, the cotton is well rinsed, thoroughly soaped at the boil, rinsed with warm and cold water and dried. A pale yellow colour is obtained.

The dyestuff used in this example may be obtained, for example, as follows:

6.1 parts of 4-amino-5-mercaptobenzoic acid hydrochloride are dissolved in 100 parts of anhydrous pyridine at 80° C. 4.6 parts of azobenzene-p,p′-dicarboxylic acid dichloride are then added and the whole is boiled under reflux for 12 hours while stirring. After the reaction mixture has been cooled, the dyestuff which is crystallized out is isolated by filtration, washed with alcohol and water and dried under vacuum.

Example 28

10 parts of the azo dyestuff which is obtained by condensation of 2 mols of dehydrothio-p-toluidine sulphonic acid with 1 mol of dinitrostilbenedisulphonic acid, are taken up in 980 parts of water and boiled and then cooled to 25° C. A cotton fabric is padded in this liquor so that its weight increases by 60 to 70% and intermediate drying for 30 minutes at 60° C. is interposed. The fabric is then padded as described above in the second bath, which contains 899 parts of water and 20 parts of anhydrous sodium sulphate, 50 parts of sodium hydroxide solution of 30% strength, 30 parts of sodium formaldehyde sulphoxylate and 1 part of cobalt complex of dimethylglyoxime of the formula $[Co(C_4H_7N_2O_2)_2(NH_3)_2]NO_3$, and is immediately rolled up and stored in a plastics foil for 4 hours at 30° C., air being excluded. The fabric is then oxidized in the air for 30 minutes, neutralized, thoroughly soaped, rinsed with warm and cold water and dried. An intense reddish-yellow colour is obtained which becomes very considerably stronger when twice the amount of dyestuff is used and is two to three times stronger than the colour obtained without reducing agent. The colour obtained without reducing agent is only a pale reddish yellow.

Example 29

20 parts of the dyestuff of the formula

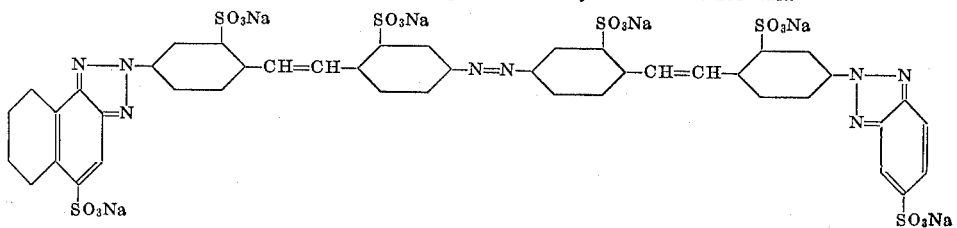

are dissolved in 900 parts of hot water, 30 parts of sodium hydroxide solution of 30% strength and 20 parts of sodium hydrosulphite are then added, vatting is carried out for 5 minutes at 95° C. and 10 parts of anhydrous sodium sulphate are added. The solution is then cooled to 30° C. A cotton fabric is so padded therewith that the weight of the fabric increases by 60 to 70%, the fabric being then oxidised in the air for 30 minutes and thoroughly rinsed. A deep golden yellow colour is obtained which is very markedly, i.e. about 25 times, stronger than the colour obtained without reducing agent.

Without reducing agent, an extremely pale, light yellow colour is obtained.

Example 30

14 parts of anthroquinone are very finely ground together with 14 parts of disodium salt of dinaphthylmethane disulphonic acid and 112 parts of water in a ball mill.

14 parts of the 10% anthraquinone paste obtained in this way are ground together with 14 parts of the azo dyestuff according to Example 1, 14 parts of disodium salt of dinaphthylmethane disulphonic acid and 98 parts of water in a ball mill.

100 parts of the 10% dyestuff paste obtained in this way are mixed with 900 parts of water, suspended by means of the high-speed stirrer and 100 parts of substrate are so padded at 25° C. that the weight of the fabric increases by 60 to 70%. After the padding, intermediate drying is carried out for 30 minutes at 60° C. The fabric is then padded as described above in a second bath containing 860 parts of water, 50 parts of sodium hydroxide solution of 30% strength, 30 parts of sodium hydrosulphite, 10 parts of anhydrous sodium sulphate and 50 parts of triethynolamine and is steamed continuously for one minute at 100° C., oxidized at about 60° C. with 50 parts of sodium perborate in 950 parts of water, rinsed neutralised, soaped at the boil, rinsed with warm and cold water and dried. A strong yellow colour is obtained which is three to four times stronger than a similar colour which is obtained exactly as described above but without the sodium hydrosulphite.

If, instead of using the said 10% anthraquinone paste in this example, the same amount of a 10% past of 2-hydroxyanthraquinone obtained in the same way is used and dyeing is carried out as described, the same good result is achieved.

On the other hand, if 100 parts of a 10% dyestuff paste which contains only the azo dyestuff and no anthraquinone or 2-hydroxyanthraquinone are used, and the same procedure as is described in paragraph 3 of this example is followed, a yellow colour is obtained which is about three times weaker than that which is obtained in the presence of the said compounds.

What is claimed is:

1. An azo-dyestuff which corresponds to the formula

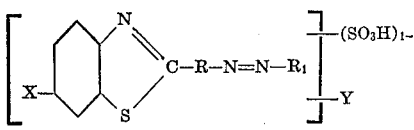

in which X represents a member selected from the group consisting of hydrogen and methyl wherein R represents a phenylene radical, $R_1$ represents a member selected from the group consisting of a phenyl and a methoxyphenyl radical, Y represents a member selected from the group consisting of a benzoylamino-, a phenylbenzthiazolyl-carboylamino-, a xenylbenzthiazolylcarboylamino-, a benzthiazolylphenylcarboylamino, a benzoxazolylphenylcarboylamino, a naphthotriazolylphenylcarboylamino radical and a radical of the formula

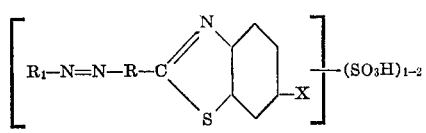

which is bound to $R_1$ through a member selected from the group consisting of a benzenedicarboxylic acid diamide bridge, a diphenylenedicarboxylic acid diamide bridge and an azodiphenylene dicarboxylic acid diamide bridge and in which $R_1$, R and X have the meanings given above.

2. An azo-dyestuff as claimed in claim 1, which contain one sulfonic acid group per benzthiazole radical.

3. An azo-dyestuff of the formula

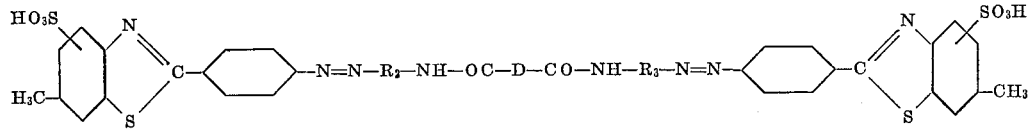

in which $R_2$, $R_3$ and D each represents a benzene radical and $R_2$ and $R_3$ each may contain a member of the group consisting of methyl and methoxy.

4. An azo-dyestuff of the formula

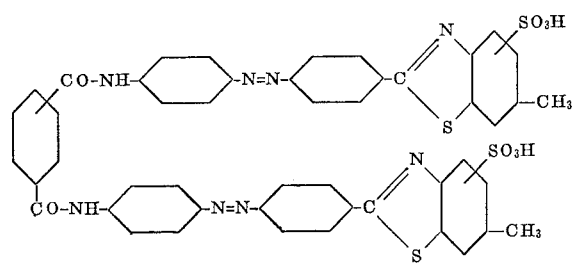

5. An azo-dyestuff of the formula

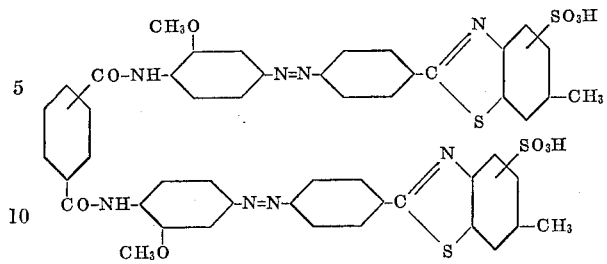

6. The azo-dyestuff of the formula

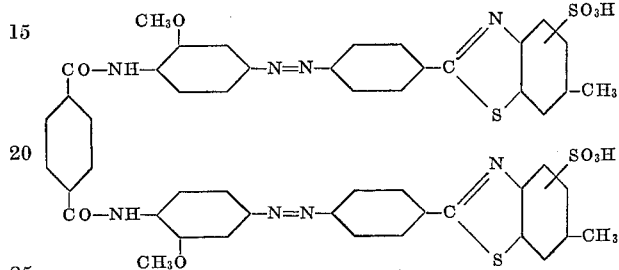

7. The azo-dyestuff of the formula

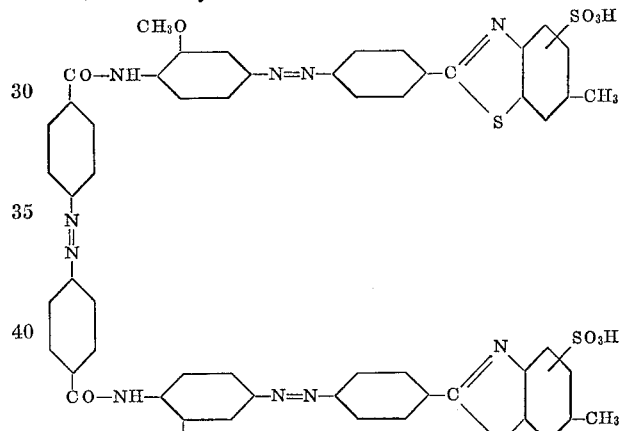

References Cited

UNITED STATES PATENTS 2,076,921   4/1937   Schindhelm et al. ____ 260—158
2,875,193   2/1959   Riat _____ 260—158

FLOYD D. HIGEL, *Primary Examiner.*

U.S. Cl. X.R.

260—304, 146; 8—41, 50, 51, 27

UNITED STATES PATENT OFFICE
CERTIFICATE OF CORRECTION

Patent No. 3,415,808                  December 10, 1968

Kurt Weber et al.

It is certified that error appears in the above identified patent and that said Letters Patent are hereby corrected as shown below:

Column 23, lines 8 to 13, the formula should appear as shown below:

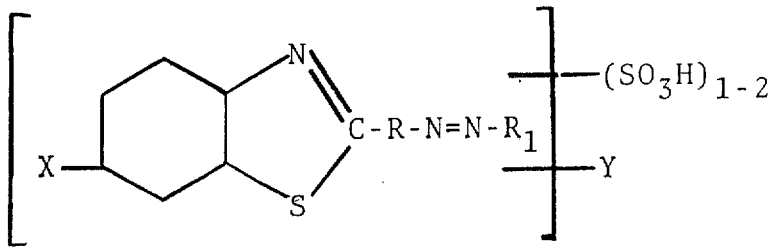

Signed and sealed this 24th day of March 1970.

(SEAL)
Attest:

EDWARD M. FLETCHER, JR.           WILLIAM E. SCHUYLER, JR.
Attesting Officer                    Commissioner of Patents